(12) United States Patent
Kung

(10) Patent No.: US 10,020,617 B1
(45) Date of Patent: Jul. 10, 2018

(54) LOCK DEVICE FOR ELECTRONIC APPARATUS

(71) Applicant: TIGEREX ENTERPRISE CO., LTD., New Taipei (TW)

(72) Inventor: Ching-Hu Kung, New Taipei (TW)

(73) Assignee: TIGEREX ENTERPRISE CO., LTD., New Taipei (TW)

( * ) Notice: Subject to any disclaimer, the term of this patent is extended or adjusted under 35 U.S.C. 154(b) by 0 days.

(21) Appl. No.: 15/611,795

(22) Filed: Jun. 2, 2017

(51) Int. Cl.
*H01R 13/44* (2006.01)
*H01R 13/639* (2006.01)
*G06F 21/85* (2013.01)

(52) U.S. Cl.
CPC ......... *H01R 13/6397* (2013.01); *H01R 13/44* (2013.01); *G06F 21/85* (2013.01)

(58) Field of Classification Search
CPC ... H01R 13/44; H01R 43/205; H01R 13/5213
USPC .................................. 439/135, 940
See application file for complete search history.

(56) References Cited

U.S. PATENT DOCUMENTS

| | | | | |
|---|---|---|---|---|
| 6,168,444 B1 * | 1/2001 | Wu | ....................... | H01R 43/205 439/135 |
| 7,479,021 B2 * | 1/2009 | Huang | ................. | H01R 13/629 439/133 |
| 8,449,309 B1 * | 5/2013 | Mosholder | ........... | H01R 13/443 439/135 |
| 2006/0234533 A1 * | 10/2006 | Lei | ......................... | H01R 13/44 439/135 |
| 2011/0188818 A1 * | 8/2011 | Sun | ......................... | G02B 6/36 385/94 |
| 2012/0108088 A1 * | 5/2012 | Peng | ................... | H01R 13/5213 439/135 |
| 2012/0282788 A1 * | 11/2012 | Lin | ...................... | H01R 13/443 439/135 |
| 2012/0289069 A1 * | 11/2012 | Chueh | .................. | H01R 13/443 439/135 |
| 2013/0029505 A1 * | 1/2013 | Hackett | ................ | H01R 13/443 439/135 |
| 2013/0084721 A1 * | 4/2013 | Lim | .................... | H01R 43/0263 439/135 |
| 2013/0102167 A1 * | 4/2013 | Litowitz | .............. | H01R 13/443 439/135 |
| 2015/0339498 A1 * | 11/2015 | Ahn | ....................... | G06F 21/83 726/34 |
| 2016/0294098 A1 * | 10/2016 | Clark | ...................... | G06F 21/83 |

* cited by examiner

Primary Examiner — Gary Paumen
(74) Attorney, Agent, or Firm — Jackson IPG PLLC; Demian K. Jackson

(57) ABSTRACT

A lock device for electronic apparatus includes a lock body and a lock-operating unit. The lock body is configured for correspondingly plugging into a port on an electronic apparatus and has at least one protruded section formed therein for tightly abutting on a protrusion located to one lateral side of a plurality of terminals in the port, so that the lock body is locked to the port. And, the lock body locked to the port can be pulled out of the port only with a specific corresponding lock-operating unit.

14 Claims, 17 Drawing Sheets

LOCK DEVICE FOR ELECTRONIC APPARATUS

FIELD OF THE INVENTION

The present invention relates to a lock device for electronic apparatus, and more particularly, to a lock device for locking a port formed on an electronic apparatus.

BACKGROUND OF THE INVENTION

Generally, an electronic apparatus is provided with a narrow slot or a port, into which an access means can be plugged, so that the access means can be programmed for use or data stored in the access means can be accessed. The port is internally provided with a plurality of terminals, which is in electrical contact with terminals correspondingly provided in the access means to supply power to the access means and form an electrical connection between the electronic apparatus and the access means. While the rapid development in the scientific technological field brings a lot of conveniences to people's daily life, many security problems in using high-tech electronic apparatus also occur. For example, malicious users can easily steal data stored in the electronic apparatus simply by plugging an access means into the port on the electronic apparatus. In view of this fact, it is necessary to take suitable measures to prevent any arbitrary or unauthorized data access via the port with any available access means.

It is therefore tried by the inventor to develop a lock device for electronic apparatus in order to solve the security problems in using the electronic apparatus.

SUMMARY OF THE INVENTION

A primary object of the present invention is to provide a lock device having a lock body that can be plugged into a port on an electronic apparatus to stop other access means from accessing the port and accordingly prevent arbitrary reading or writing of data from or into the electronic apparatus via the port.

Another object of the present invention is to provide a lock device having a lock body that can be plugged into a port on an electronic apparatus and is internally provided with a protruded section. When the lock body is fully plugged into the port, the internal protruded section tightly abuts on a plurality of terminals formed in the port and accordingly prevents the lock body from being arbitrarily pulled out of the port of the electronic apparatus.

A further object of the present invention is to provide a lock device having a lock body that can be plugged into a port on an electronic apparatus and can be pulled out of the port only with a specific corresponding lock-operating unit.

A still further object of the present invention is to provide a lock device for electronic apparatus, a lock body of which is configured to match a USB Type-C connector.

To achieve the above and other objects, the lock device for electronic apparatus according to the present invention includes a lock body and a corresponding lock-operating unit, and the electronic apparatus includes a port internally provided with a plurality of terminals and a protrusion located to one side of front ends of the terminals. The lock body includes a lock portion and a cover portion. The lock portion has a top side and a bottom side, which together define a receiving chamber between them. At least one protruded section is formed in the receiving chamber for correspondingly abutting on the protrusion in the port of the electronic apparatus. The cover portion has two open ends and internally defines a receiving space between the two open ends for receiving the lock portion therein. The lock body is configured for plugging into the port of the electronic apparatus. When the lock body is fully plugged into the port, the protruded section in the receiving chamber is tightly abutted on the protrusion in the port to lock the lock body to the port. The lock body can be pulled out of the port only with the corresponding lock-operating unit.

In an embodiment of the present invention, the lock body has an open front end and a closed rear end, and the open front end is communicable with the receiving chamber.

In an embodiment of the present invention, the lock portion includes a first inner wall surface, a second inner wall surface located adjacent to the first inner wall surface, and a third inner wall surface located opposite to the first inner wall surface; and the protruded section is formed on one of the first and the third inner wall surface.

In an embodiment of the present invention, the protruded section is formed on each of the first and the third inner wall surface.

In an embodiment of the present invention, the protruded section is a straight post or an upward tapered post in shape.

In an embodiment of the present invention, the lock portion is formed on two lateral sides of the top side with a retaining section each, and the lock portion is formed on the bottom side with a bottom opening, which is communicable with the receiving chamber and the open front end.

In an embodiment of the present invention, the cover portion has a top cover surface and a bottom cover surface. The top cover surface is formed with a plurality of through holes. The top cover surface of the cover portion and the top side of the lock portion together define an insertion slot between them.

In an embodiment of the present invention, the lock-operating unit is configured for correspondingly connecting to the insertion slot of the lock body. The lock-operating unit includes a case portion, a slide portion, a slide-controlled retaining element and a union element. The slide portion is correspondingly fitted in the case portion and includes a top plate and a side plate downward extended from each of two opposite lateral edges of the top plate. The top plate has a push block raised from an upper side thereof and a limiting rib axially formed on a lower side thereof. The slide-controlled retaining element is disposed in the case portion and assembled to the slide portion. The slide-controlled retaining element includes a main body having a hole provided thereon and two laterally spaced extension arms forward extended from the main body. The two extension arms have two facing edges that form two slant sections; a limiting space is defined between the two extension arms and the limiting rib is correspondingly movable in along the limiting space; and two laterally outward extended hooks are formed on front ends of the two extension arms. The union element is disposed in the case portion with an extended front end forward projected beyond the case portion. The extended front end of the union element is provided at two lateral sides with a slit each; and the two extension arms of the slide-controlled retaining element are fitted in the union element with the two laterally outward extended hooks located corresponding to the two slits. The extended front end of the union element is configured for correspondingly plugging into the insertion slot of the lock body, and the two slits are located in and communicable with the insertion slot when the extended front end is fully plugged into the insertion slot. When the slide portion is pushed toward the lock body, the limiting rib is brought to press against and accordingly laterally separate the two facing slant sections of the extension arms from each other, bringing the two hooks to extend through the two slits into the two retaining sections on the lock body.

In an embodiment of the present invention, the case portion of the lock-operating unit includes an upper case portion and a lower case portion closed to each other; the upper case portion is provided with a top opening, via which the push block of the slide portion is exposed from the upper case portion; the lower case portion internally defines a restricting passage, in along which the limiting rib of the slide portion is slidably fitted; and a boss is formed in the restricting passage near an end thereof for engaging with the hole provided on the main body of the slide-controlled retaining element.

In an embodiment of the present invention, the lock portion includes a lock core formed on the top side at a central area thereof, and the lock-operating unit is provided on the extended front end with a core-matching section adapted to engage with the lock core.

In an embodiment of the present invention, the lock-operating unit further includes a storage case, which internally defines an open storage space with a pivot boss provided therein. The case portion is provided with a pivot hole corresponding to the pivot boss, so that the pivot boss is pivotally turnably received in the pivot hole, allowing the lock-operating unit not in use to be turned about the pivot boss into the storage space for storage.

In an embodiment of the present invention, the lock portion of the lock body is further provided on an outer wall surface facing away from the second inner wall surface with a first retaining section, and the lock-operating unit is provided on a front end of the lower case portion with a second retaining section complementarily corresponding to the first retaining section. The first retaining section includes at least one protruded block or at least one recess, and the second retaining section includes the other one of the at least one protruded block and the at least one recess.

In an embodiment of the present invention, the lock body is a lock device structurally configured corresponding to a USB Type-C connector.

With the structural design of the present invention, when the lock body is fully plugged into a port of an electronic apparatus, the protruded section formed in the receiving chamber of the lock body will tightly abut on a plurality of terminals in the port to create a locked state, preventing the lock body from being arbitrarily pulled out of the port. With the lock body being locked in the port, any data in the electronic apparatus can not be arbitrarily read or recorded via the port. In the case the lock body has the first retaining section formed thereon, only a lock-operating unit having a corresponding second retaining section can be used to remove the lock body from the port. That is, the lock body can be unlocked from the port only with a specific corresponding lock-operating unit. With these arrangements, it is able to effectively prevent the lock body from being arbitrarily pulled out of the port with other unmatched lock-operating units.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
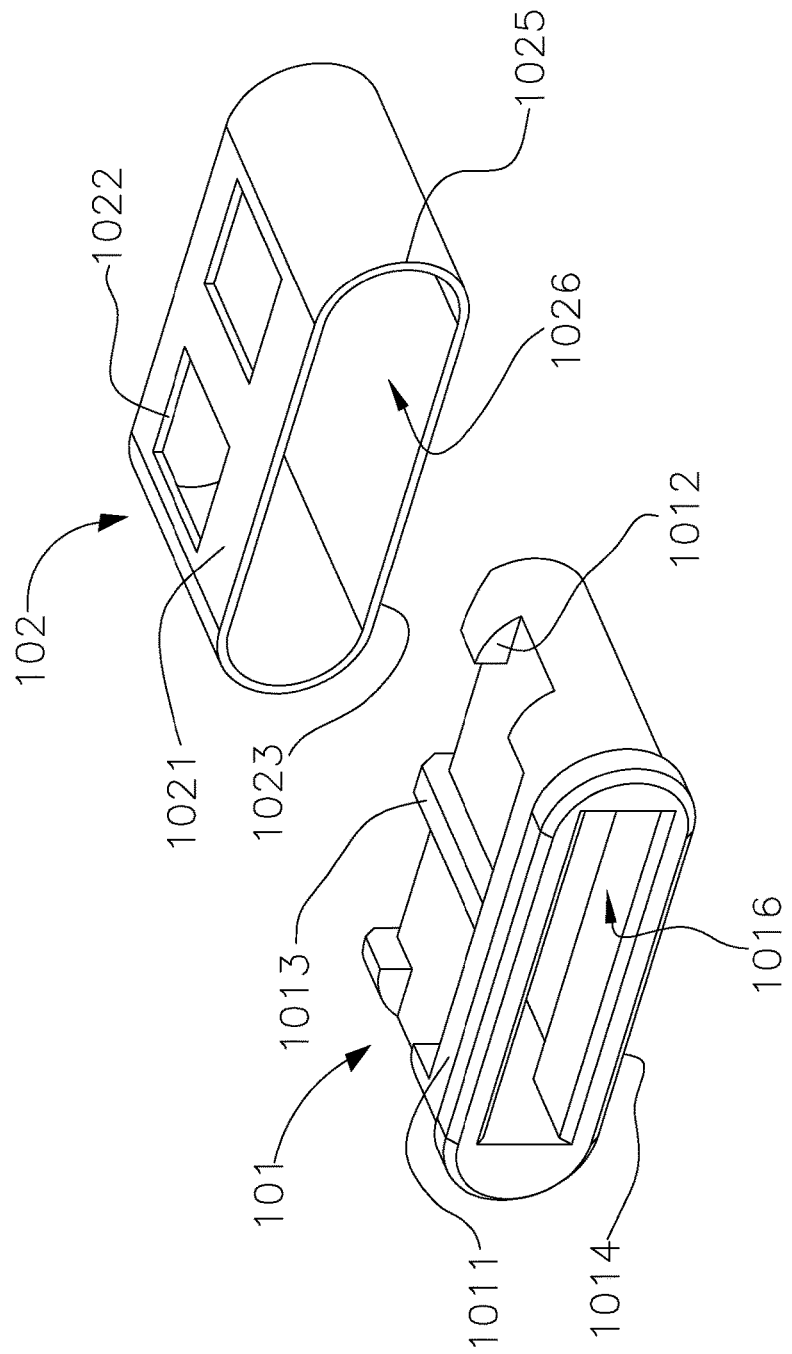
FIG. 1A is an exploded, top front perspective view showing a first embodiment of a lock body of the lock device for electronic apparatus according to the present invention.

The present invention will now be described with some preferred embodiments thereof and by referring to the accompanying drawings. For the purpose of easy to understand, elements that are the same in the preferred embodiments are denoted by the same reference numerals.

Figure 2:
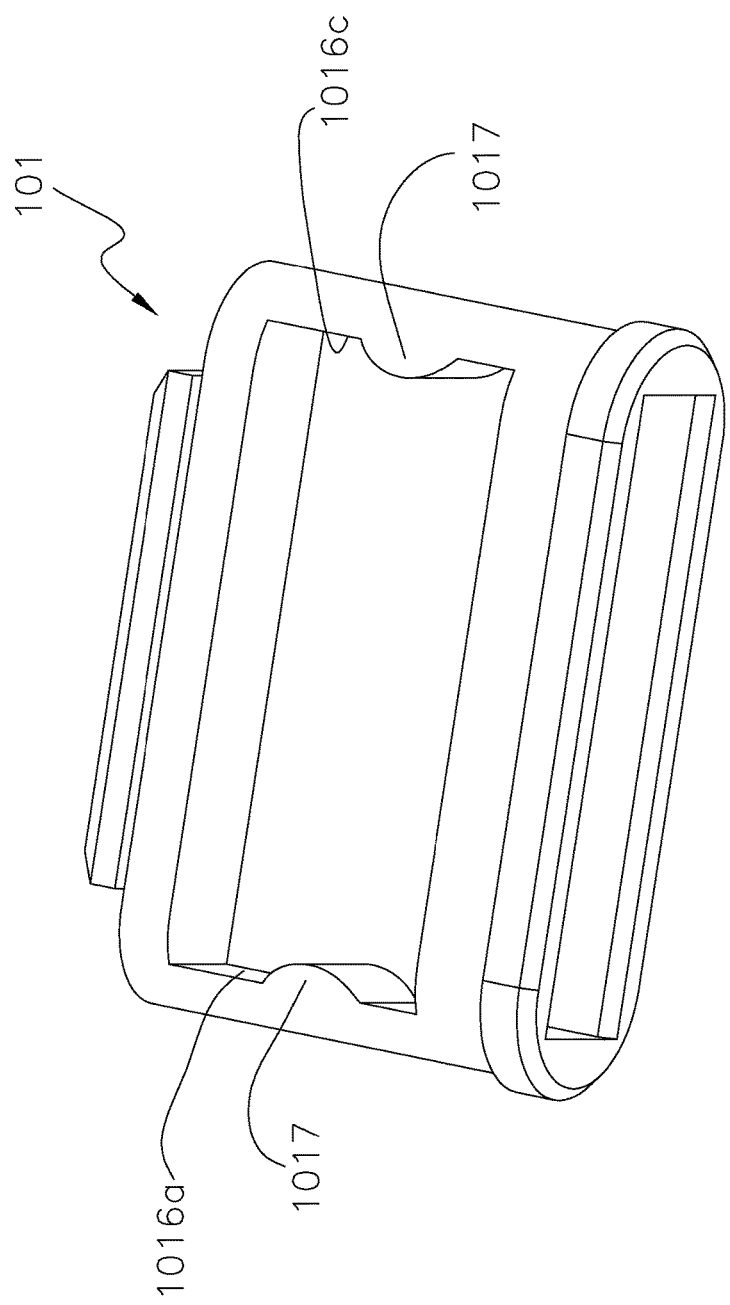
FIG. 2 is a perspective view showing a lock portion for a second embodiment of the lock body of the lock device for electronic apparatus according to the present invention.
Figure 3:
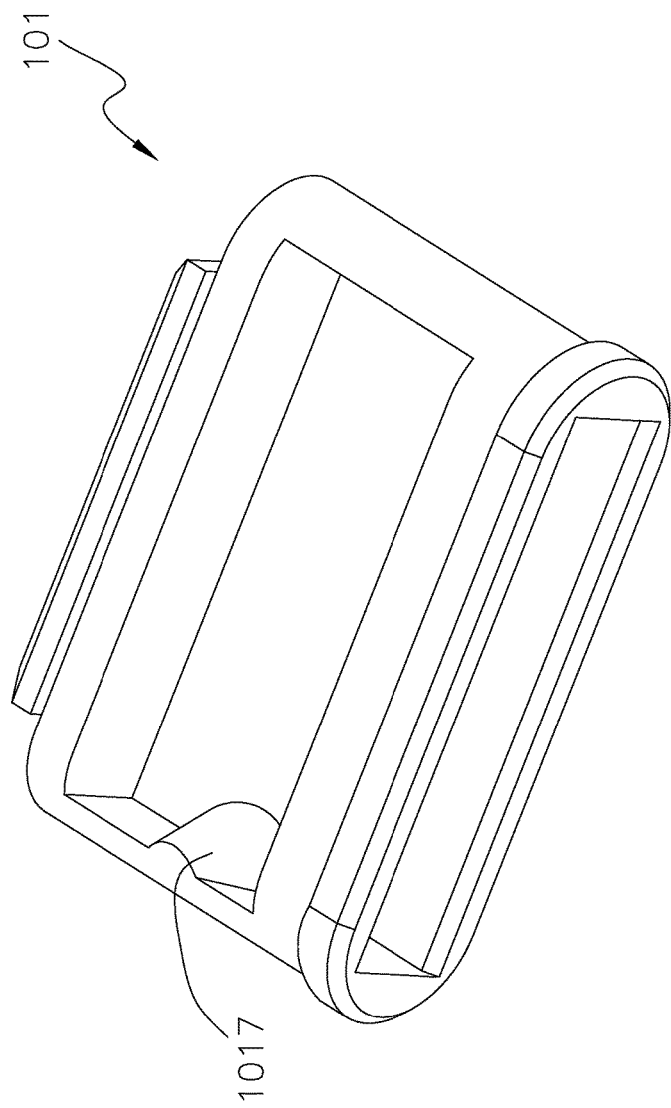
FIG. 3 is a perspective view showing a lock portion for a third embodiment of the lock body of the lock device for electronic apparatus according to the present invention.

The present invention relates to a lock device for electronic apparatus, which includes a lock body and a lock-operating unit. Please refer to FIGS. 1A and 1B, which are exploded top and bottom front perspective views, respectively, of a first embodiment of the lock body; and to FIGS. 1C and 1D, which are assembled front and rear perspective views, respectively, of the lock body of FIG. 1A. Herein, the lock body is generally denoted by reference numeral 10, and includes a lock portion 101 and a cover portion 102. As can be seen from FIG. 1A, the lock portion 101 has a top side 1011 and a bottom side 1014, which together define a receiving chamber 1016 between them. As can be seen from FIG. 1B, the receiving chamber 1016 has a first inner wall surface 1016a, a second inner wall surface 1016b located adjacent to the first inner wall surface 1016a, and a third inner wall surface 1016c located opposite to the first inner wall surface 1016a; and a protruded section 1017 is formed on any one or both of the first and the third inner wall surface 1016a, 1016c. In the illustrated first embodiment of the lock body 10, the protruded section 1017 is formed only on one of the first and the third inner wall surface 1016a, 1016c, as shown in FIG. 1B. However, it is understood, FIG. 1B is only illustrative and not intended to limit the present invention in any way. In a second embodiment of the lock body 10, the protruded section 1017 is formed on each of the first and the third inner wall surface 1016a, 1016c, as shown in FIG. 2, to provide the same effect as the first embodiment. Further, the protruded section 1017 can be a straight or a tapered post in shape. In the illustrated first and second embodiments of the lock body 10 as shown in FIGS. 1B and 2, respectively, each protruded section 1017 is a straight semicircular post; and in a third embodiment of the lock body 10 as shown in FIG. 3, the protruded section 1017 is a upward tapered semicircular post. In practical implementation of the present invention, the protruded section 1017 is not particularly limited to any specific shape.

Figure 1B:
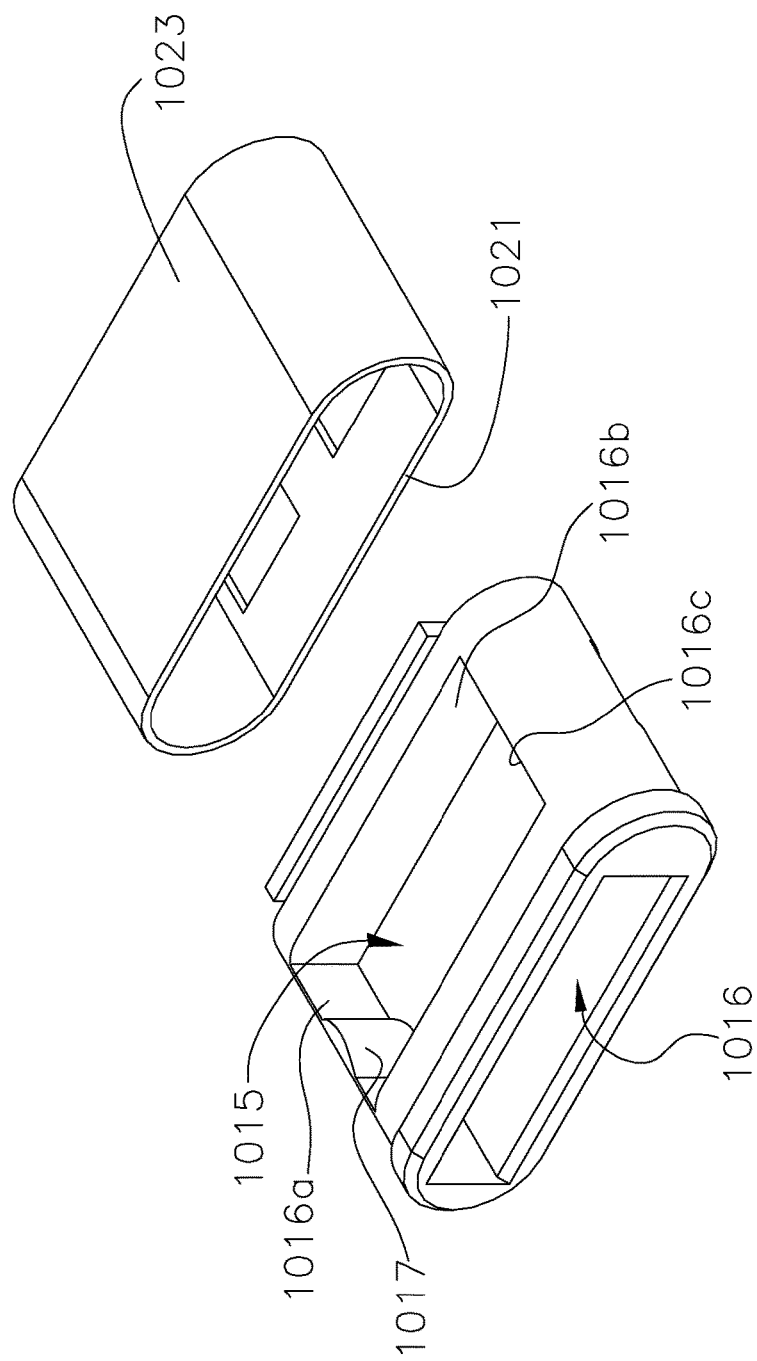
FIG. 1B is a bottom view of FIG. 1A.
Figure 1C:
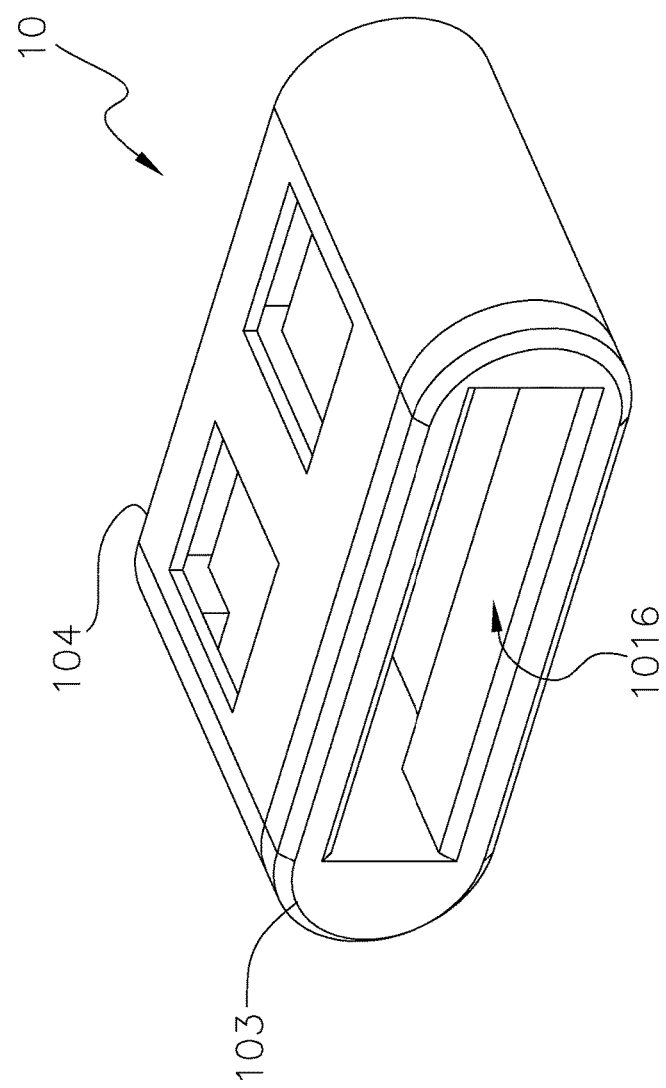
FIG. 1C is an assembled view of FIG. 1A.

The lock portion 101 is formed on two lateral sides of the top side 1011 with a retaining section 1012 each, as can be seen in FIG. 1A, and on the bottom side 1014 with a bottom opening 1015, as can be seen in FIG. 1B. The bottom opening 1015 is communicable with the receiving chamber 1016.

Figure 1D:
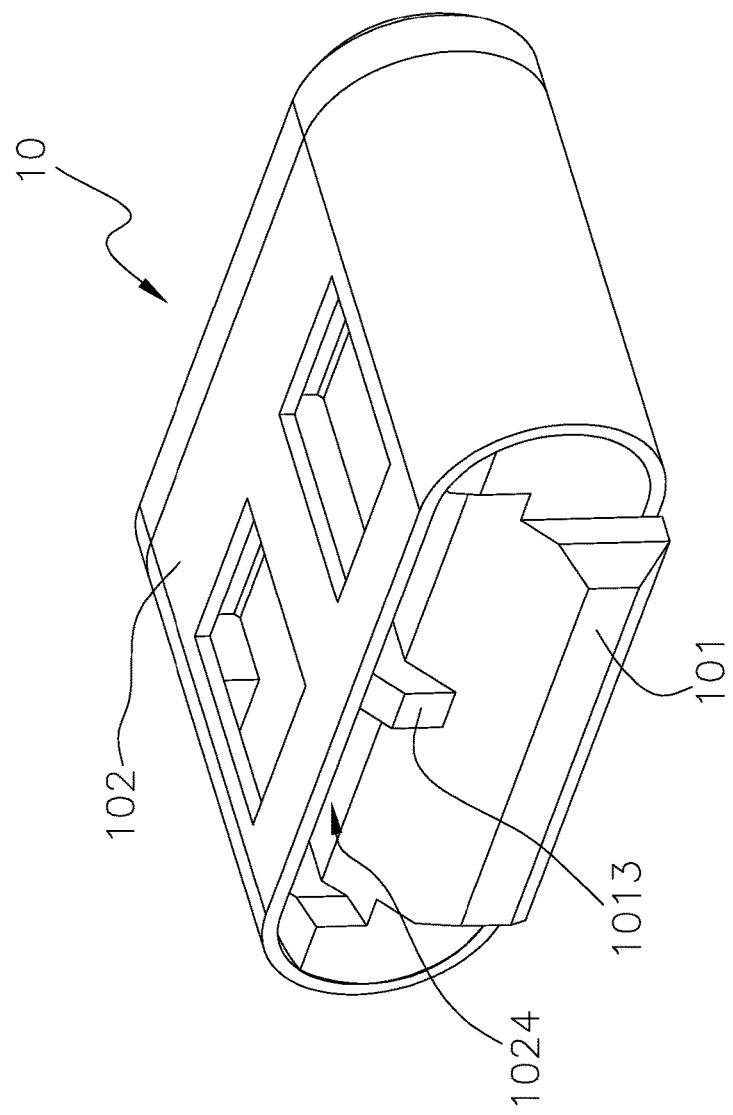
FIG. 1D is a rear view of FIG. 1C.

The cover portion 102 has two open ends 1025 and internally defines a receiving space 1026 between the two open ends 1025 for receiving the lock portion 101 therein. The cover portion 102 has a top cover surface 1021 and a bottom cover surface 1023. In the illustrated first embodiment of the lock body 10, the top cover surface 1021 is formed with a plurality of through holes 1022. However, it is understood, in other operable embodiments of the present invention, the top cover surface 1021 can be a closed surface without any through hole formed thereon. After the lock portion 101 and the cover portion 102 are assembled together, the top cover surface 1021 of the cover portion 102 and the top side 1011 of the lock portion 101 together define an insertion slot 1024 between them, as shown in FIG. 1D.

The assembled lock portion 101 and cover portion 102 form the lock body 10. The lock body 10 has an open front end 103 and a closed rear end 104. The open front end 103 is communicable with the receiving chamber 1016 and the bottom opening 1015.

According to the present invention, the lock body 10 is structurally configured corresponding to a USB Type-C connector.

Figure 4A:
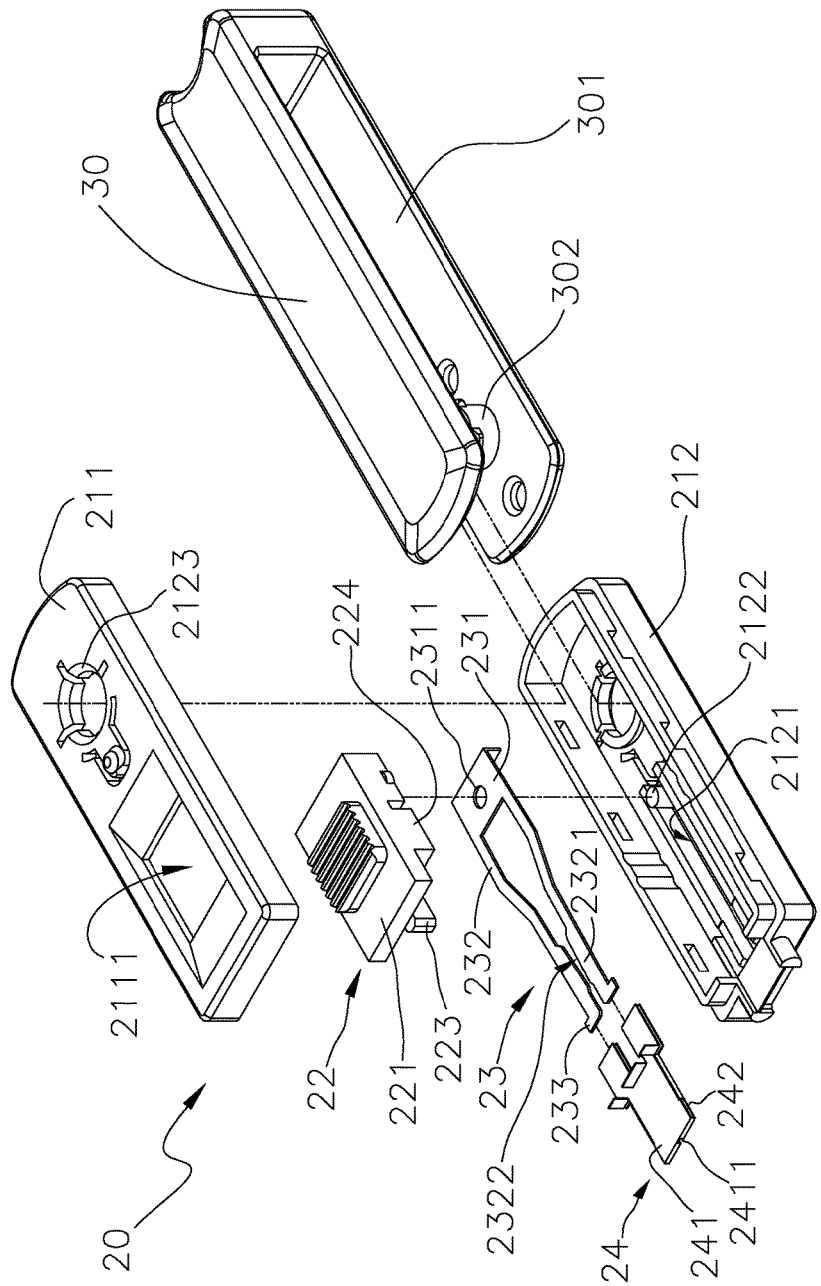
FIG. 4A is an exploded perspective view of a preferred embodiment of a lock-operating unit of the lock device for electronic apparatus according to the present invention.
Figure 4B:
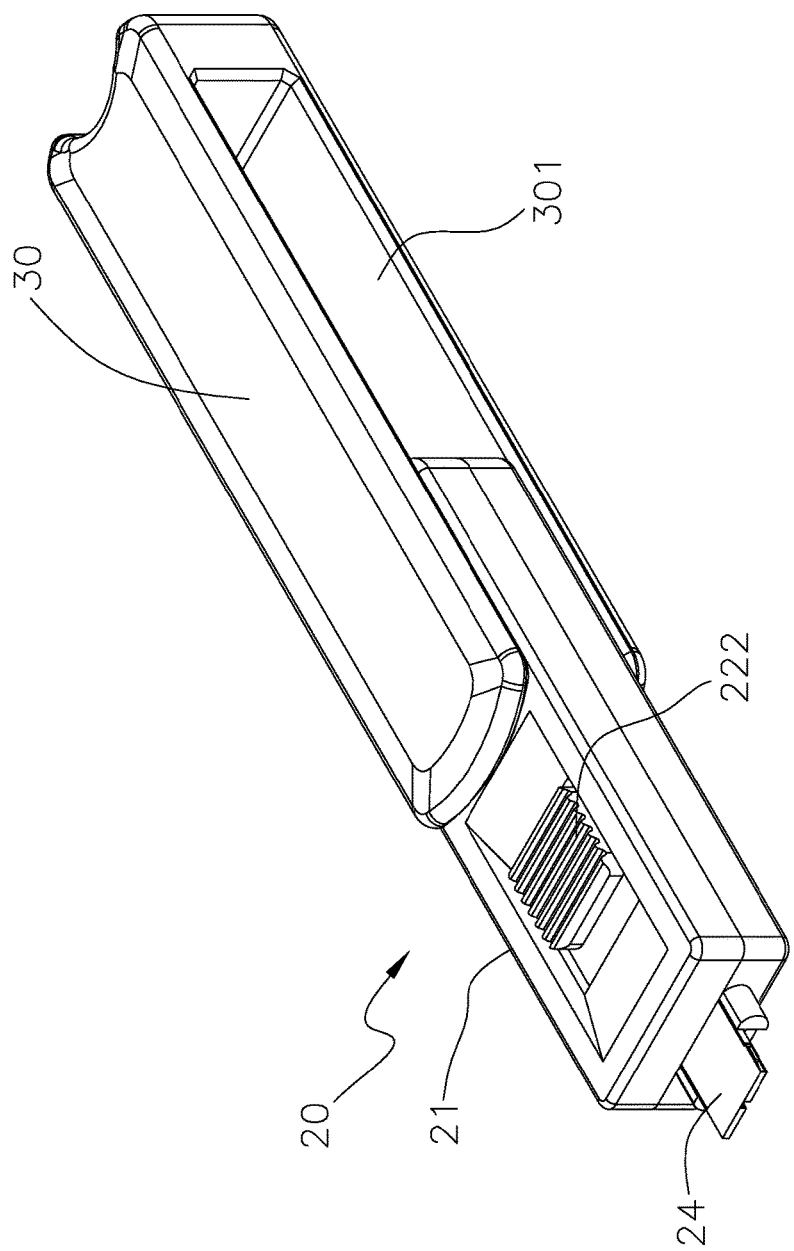
FIG. 4B is an assembled view of FIG. 4A.

Please refer to FIGS. 4A and 4B, which are exploded and assembled perspective views, respectively, of a preferred embodiment of the lock-operating unit of the lock device for electronic apparatus according to the present invention. Herein, the lock-operating unit is generally denoted by reference numeral 20. The lock-operating unit 20 is configured for correspondingly connecting to the insertion slot 1024 of the lock body 10, and includes a case portion 21, a slide portion 22, a slide-controlled retaining element 23 and a union element 24. The case portion 21 includes an upper case portion 211 and a lower case portion 212, which are closed to each other. The upper case portion 211 is provided with a top opening 2111, and the lower case portion 212 internally defines a restricting passage 2121. A boss 2122 is formed in the restricting passage 2121 near an end thereof.

The slide portion 22 is correspondingly fitted in the case portion 21. The slide portion 22 includes a top plate 221 and a side plate 224 downward extended from each of two opposite lateral edges of the top plate 221. A push block 222 is raised from an upper side of the top plate 221 to correspondingly engage with and upward expose from the top opening 2111 of the upper case portion 211. The top plate 221 has a limiting rib 223, which is axially formed on a lower side of the top plate 221 and is correspondingly slidably fitted in the restricting passage 2121.

The slide-controlled retaining element 23 is disposed in the case portion 21 and is assembled to the slide portion 22. The slide-controlled retaining element 23 includes a main body 231 and two laterally spaced extension arms 232 forward extended from the main body 231 to face each other. The main body 231 is provided with a hole 2311 for engaging with the boss 2122 on the lower case portion 212. Two facing edges of the two extension arms 232 respectively include a slant section 2321, which is formed at a position some distance behind a front end of each of the extension arms 232. A limiting space 2322 is formed between the two extension arms 232, and the limiting rib 223 is correspondingly movable in along the limiting space 2322. Two laterally outward extended hooks 233 are formed on the front ends of the two extension arms 232.

The union element 24 is disposed in the case portion 21 with an extended front end 241 forward projected beyond the case portion 21. The extended front end 241 of the union element 24 is provided at two lateral sides with a slit 242 each. The two extension arms 232 of the slide-controlled retaining element 23 are fitted in the union element 24 with the two laterally outward extended hooks 233 located correspondingly to the two slits 242.

The extended front end 241 is configured for correspondingly plugging into the insertion slot 1024 of the lock body 10. When the extended front end 241 of the union element 24 is fully plugged into the insertion slot 1024, the two slits 242 are located in and communicable with the insertion slot 1024. When the slide portion 22 is pushed forward, the limiting rib 223 thereof is brought to press against and accordingly laterally separate the two facing slant sections 2321 of the extension arms 232 from each other. At this point, the two hooks 233 are brought to extend through the two slits 242 into the two retaining sections 1012 on the lock body 10.

As can be seen in FIG. 1A, in the first embodiment of the lock body 10, the lock portion 101 includes a lock core 1013 formed on the top side 1011 at a central area thereof. On the other hand, as can be seen in FIG. 4A, the extended front end 241 of the lock-operating unit 20 is provided with a core-matching section 2411 adapted to engage with the lock core 1013. However, the lock core 1013 and the core-matching section 2411 are not necessary structures in the present invention. In other words, the lock portion 101 and the lock-operating unit 20 without the lock core 1013 and the core-matching section 2411, respectively, can still work to achieve the intended function of the present invention.

Figure 5A:
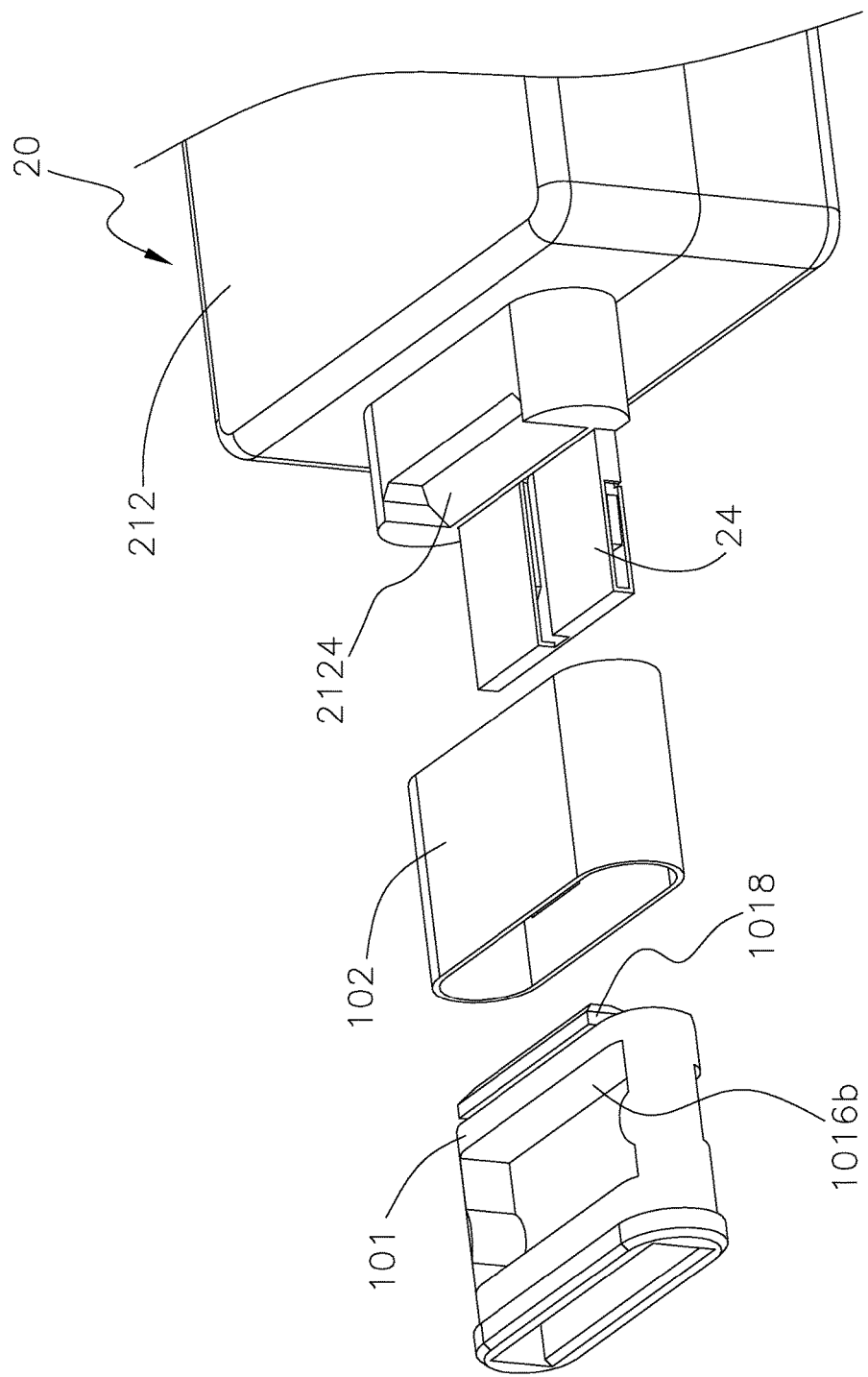
FIG. 5A is an exploded, fragmentary perspective view showing a first variation of the preferred embodiment of the lock-operating unit.
Figure 5B:
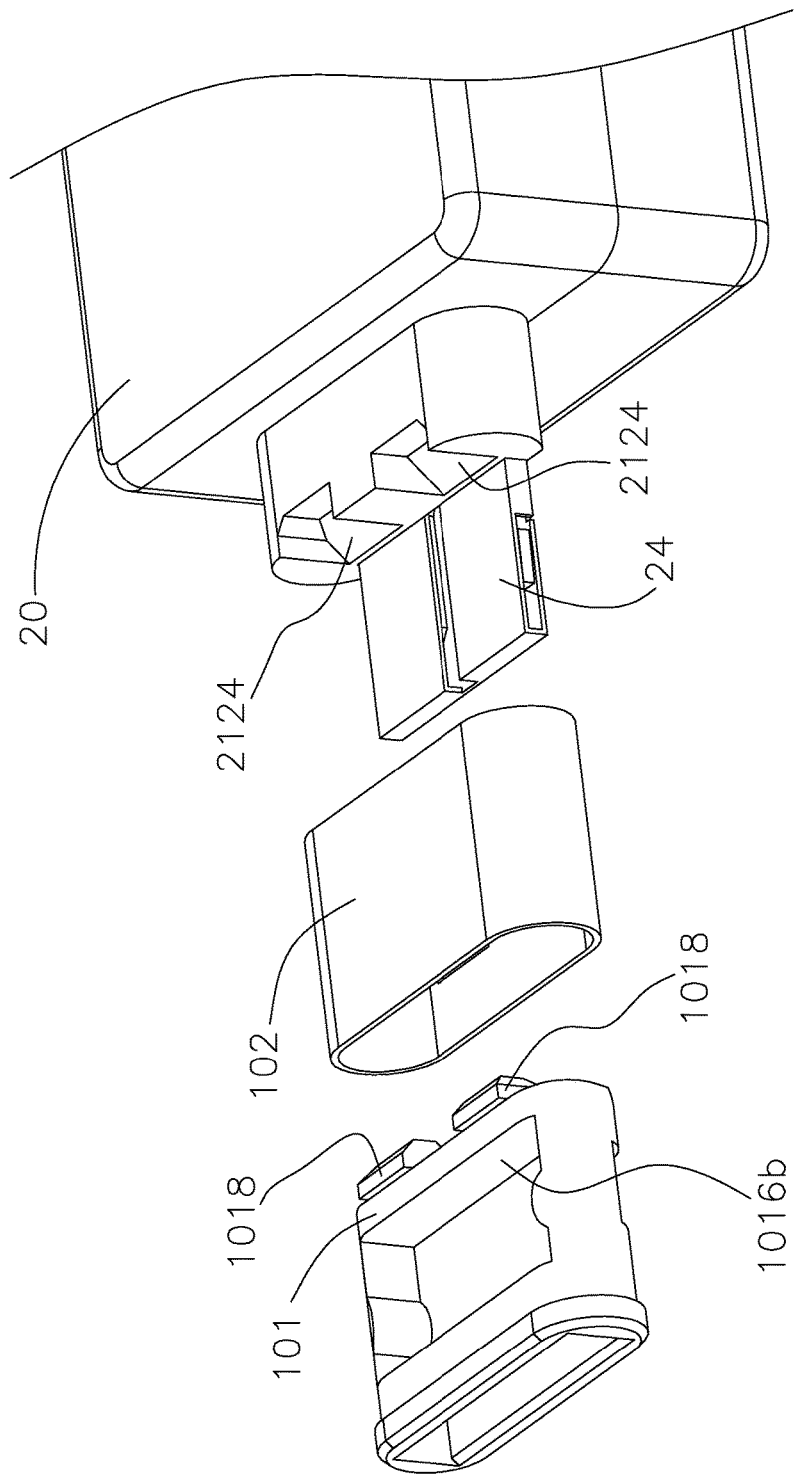
FIG. 5B is an exploded, fragmentary perspective view showing a second variation of the preferred embodiment of the lock-operating unit.

Please refer to FIG. 5A. It is particularly noted that, in the first embodiment of the lock body 10, the lock portion 101 is further provided on an outer wall surface facing away from the second inner wall surface 1016b with at least one first retaining section 1018, and the lock-operating unit 20 is provided on a front end of the lower case portion 212 with at least one second retaining section 2124 complementarily corresponding to the first retaining section 1018. The number, shape and arrangement of the first retaining sections 1018 are unique on each lock portion 101, and the number, shape and arrangement of the second retaining sections 2124 on the lock-operating unit 20 must match those of the first retaining sections 1018 on a corresponding lock body 10 to enable unlocking of the lock body 10 with the lock-operating unit 20. By providing the first and second retaining sections 1018, 2124, it is able to prevent the plugging of an unmatched lock-operating unit 20 into the lock body 10 to unlock the latter. In the illustrated first embodiment, the first retaining section 1018 is a male retaining section in the form of a protruded block, and the second retaining section 2124 is a female retaining section in the form of a recess. Only when the protruded block and the recess are completely matched and associated with each other can the lock body 10 be unlocked. In another operable embodiment as shown in FIG. 5B, two first retaining sections 1018 are provided to form two laterally spaced protruded blocks, and two second retaining sections 2124 are provided to form two laterally spaced recesses.

Figure 6A:
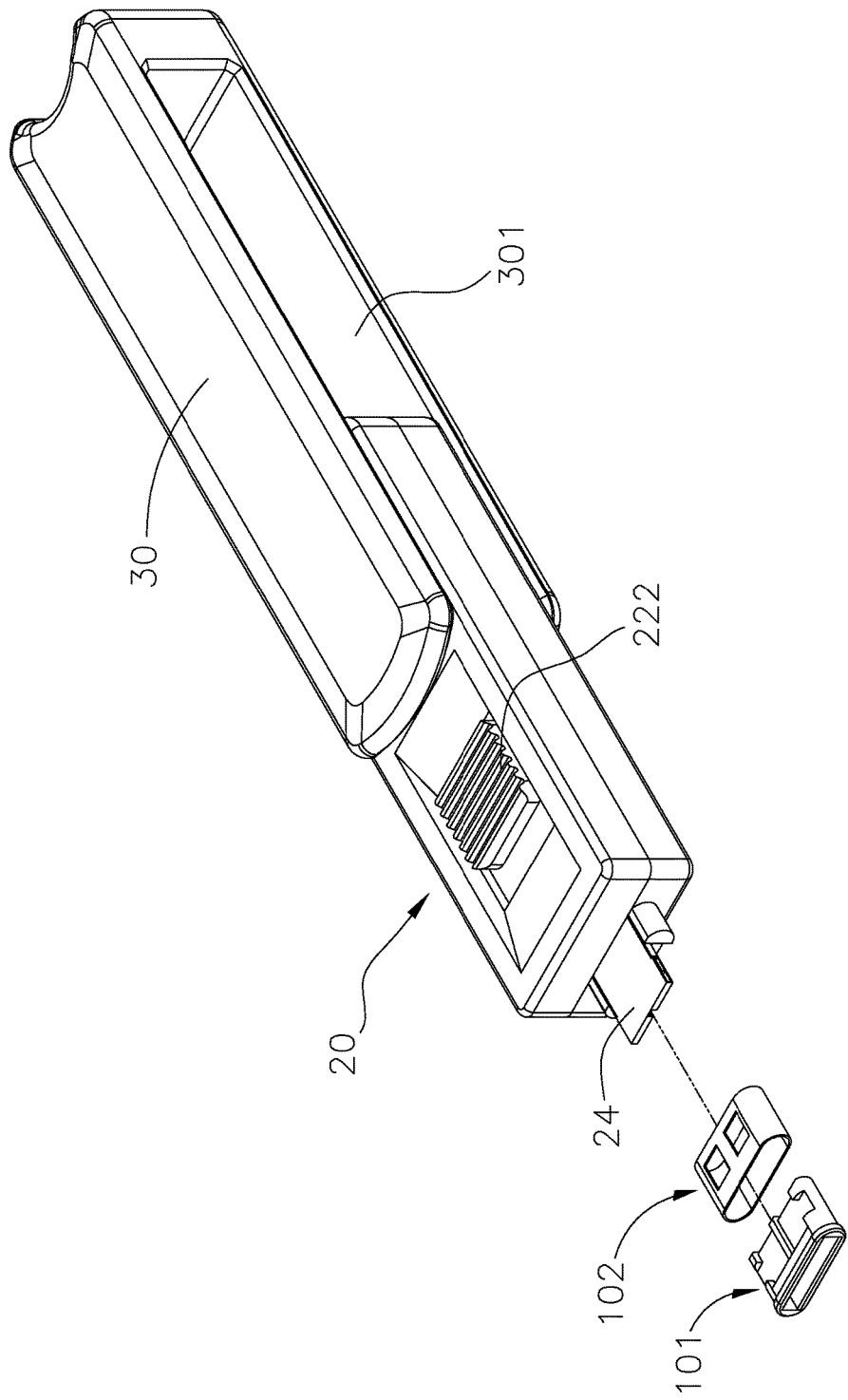
FIG. 6A is an exploded perspective view showing the lock body and the lock-operating unit of the lock device for electronic apparatus according to the present invention.
Figure 6B:
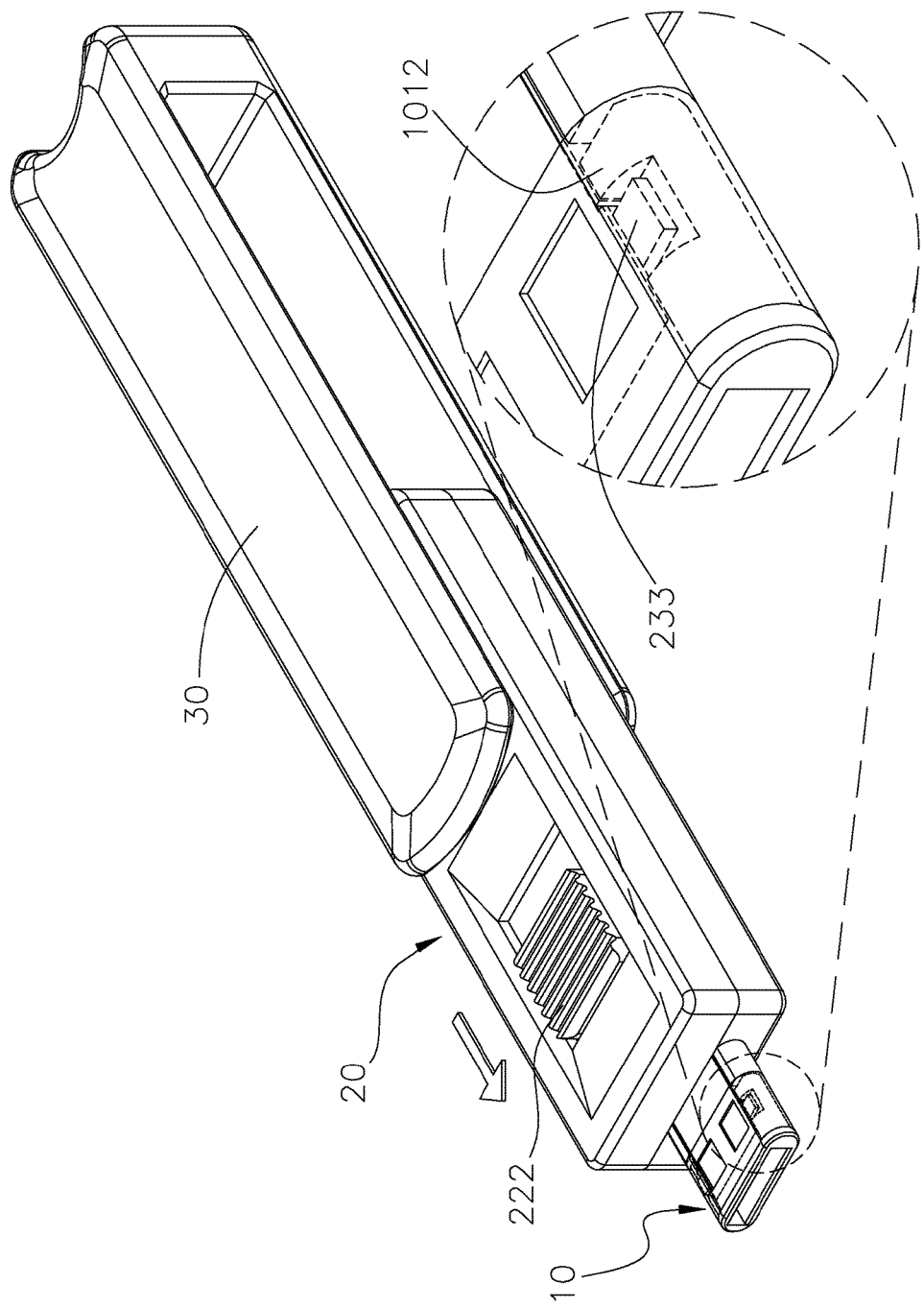
FIG. 6B is an assembled view of FIG. 6A, showing the lock-operating unit is operated to engage with the lock body for moving the latter freely.
Figure 6C:
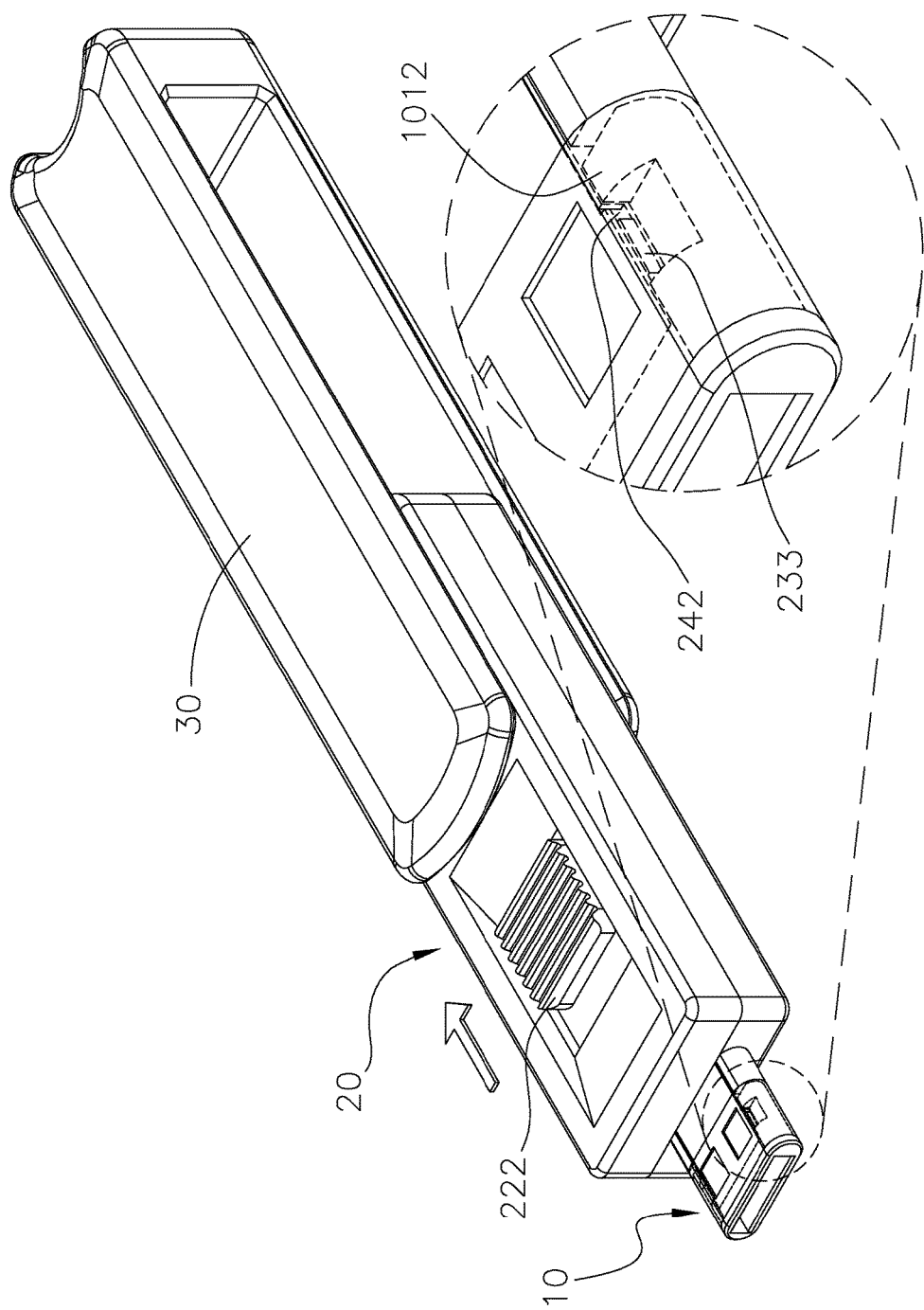
FIG. 6C shows the lock-operating unit is operated to disengage from the lock body.

FIGS. 6A, 6B and 6C illustrate the connection of the lock-operating unit 20 to the lock body 10 for operating the latter. Please refer to FIGS. 6a to 6C along with FIGS. 4A and 4B. To operate the lock body 10, first plug the union element 24 of the lock-operating unit 20 into the insertion slot 1024 of the lock body 10, so that the two slits 242 of the union element 24 are located in the insertion slot 1024. Then, forward push the slide portion 22 at the slide block 222 and accordingly move the limiting rib 223 toward the lock body 10. At this point, the limiting rib 223 is pressed against the two slant sections 2321 of the two extension arms 232, forcing them to move laterally outward and separate from each other, so that the two hooks 233 are extended through the two slits 242 into the retaining sections 1012 on the top side of the lock body 10. At this point, the lock-operating unit 20 is connected to the lock body 10 and can move the latter forward or backward. On the other hand, when applying a force against the push block 222 to push the slide portion 22 backward, the two slant sections 2321 of the two extension arms 232 are released from the limiting rib 223 to move toward each other again and the two hooks 233 at the front ends of the extension arms 232 are disengaged from the two slits 242, allowing the lock-operating unit 20 to separate from the lock body 10.

Figure 7:
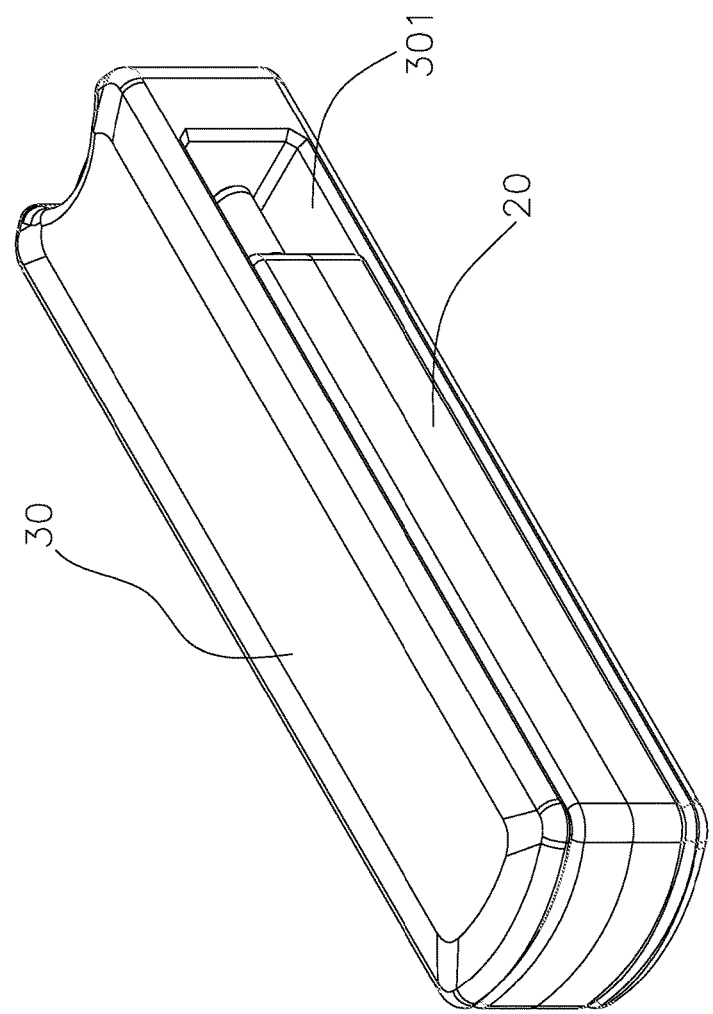
FIG. 7 shows the lock-operating unit not in use can be received in a storage case.

Please refer to FIGS. 4A, 4B and 7. The lock-operating unit 20 further includes a substantially U-shaped storage case 30, which internally defines an open storage space 301 with a pivot boss 302 provided therein. Meanwhile, the case portion 21 is provided with a pivot hole 2123 corresponding to the pivot boss 302, so that the pivot boss 302 is pivotally turnably received in the pivot hole 2123. When the lock-operating unit 20 is not in use, it can be pivotally turned about the pivot boss 302 into the storage space 301 of the storage case 30 for storage, as shown in FIG. 7. To use the lock-operating unit 20, simply push it out of the storage case 30 from any one of two open lateral sides of the storage case 30.

Figure 8:
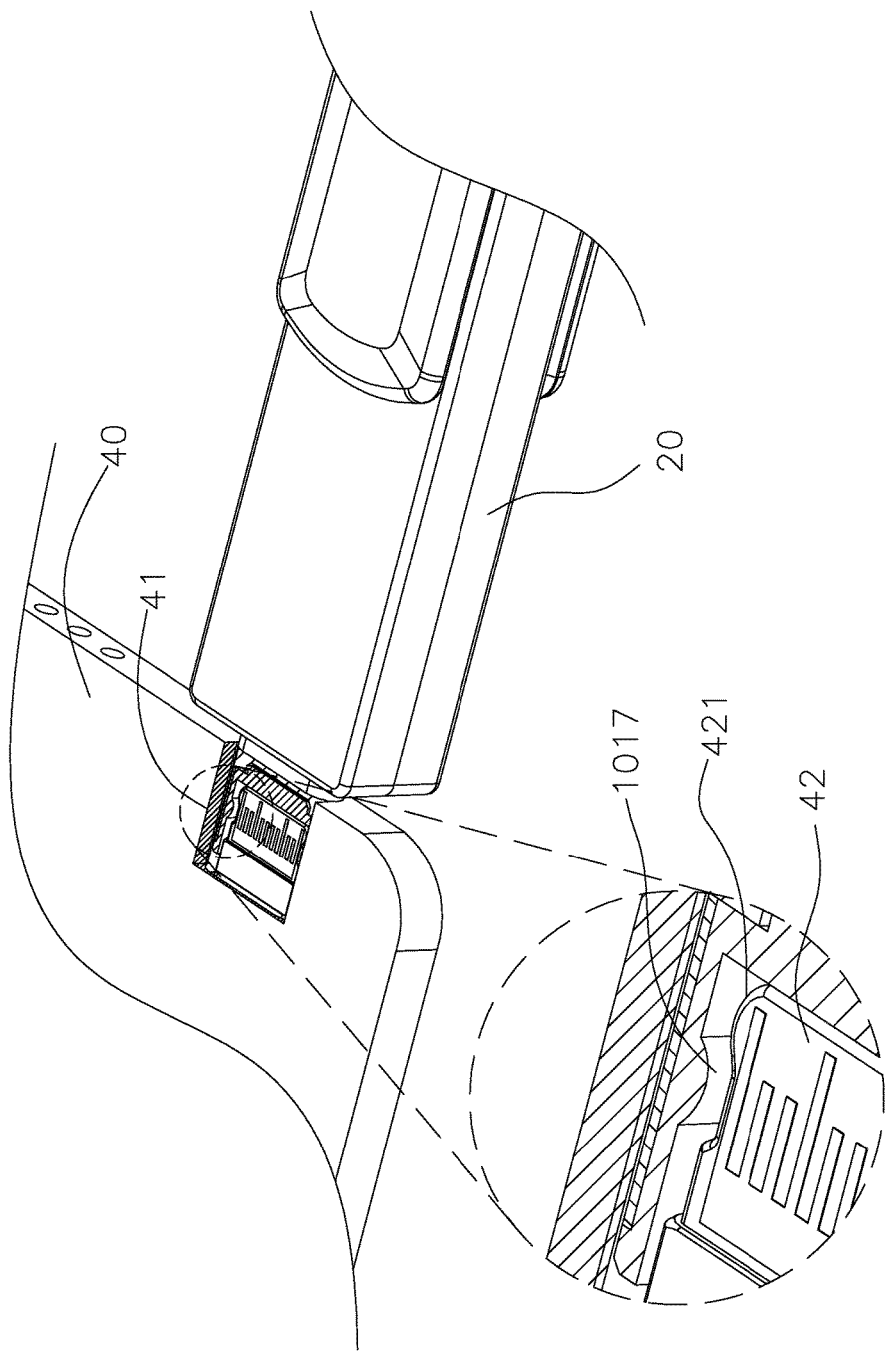
FIG. 8 is a partially cutaway view showing the use of the lock-operating unit to plug the lock body into a port on an electronic apparatus for locking the port.
Figure 9:
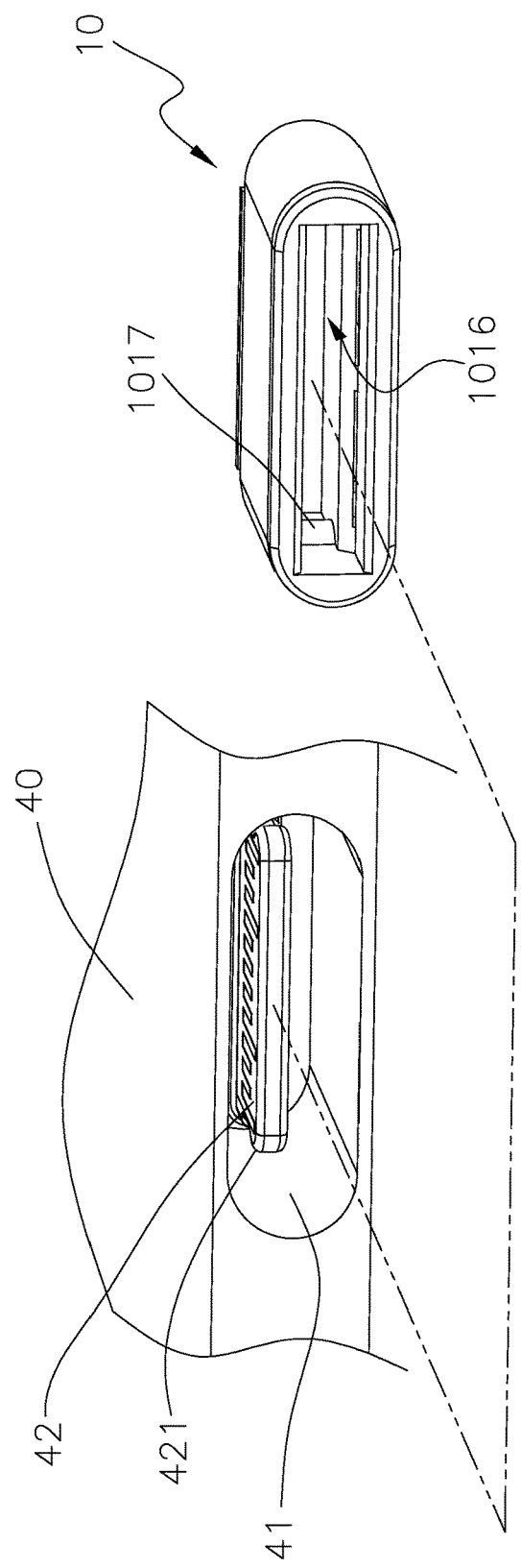
FIG. 9 is an enlarged, exploded perspective view showing the lock body of the lock device of the present invention and the port on the electronic apparatus to be locked by the lock body.

FIGS. 8 and 9 are partially cutaway view and enlarged exploded perspective view, respectively, illustrating how the lock body 10 is plugged into a port 41 on an electronic apparatus 40 to lock the port 41. The port 41 is internally provided with a plurality of terminals 42, with which a plurality of terminals 42 inside an access means is electrically contacted. A sideward protrusion 421 is formed on at least one lateral side of front ends of the terminals 42 to firmly abut on the protruded section 1017 formed in the receiving chamber 1016 of the lock portion 101. When the lock body 10 is plugged into the port 41 of the electronic apparatus 40 using the lock-operating unit 20 and the protruded section 1017 is tightly abutted on an inner end of the protrusion 421, the lock body 10 can be held in the port 41 to lock the latter. To remove the lock body 10 from the electronic apparatus 40, simply connect a specific corresponding lock-operating unit 20 to the lock body 10 as previously described with reference to FIGS. 6A to 6C, and pull the lock body 10 out of the port 41.

Figure 10:
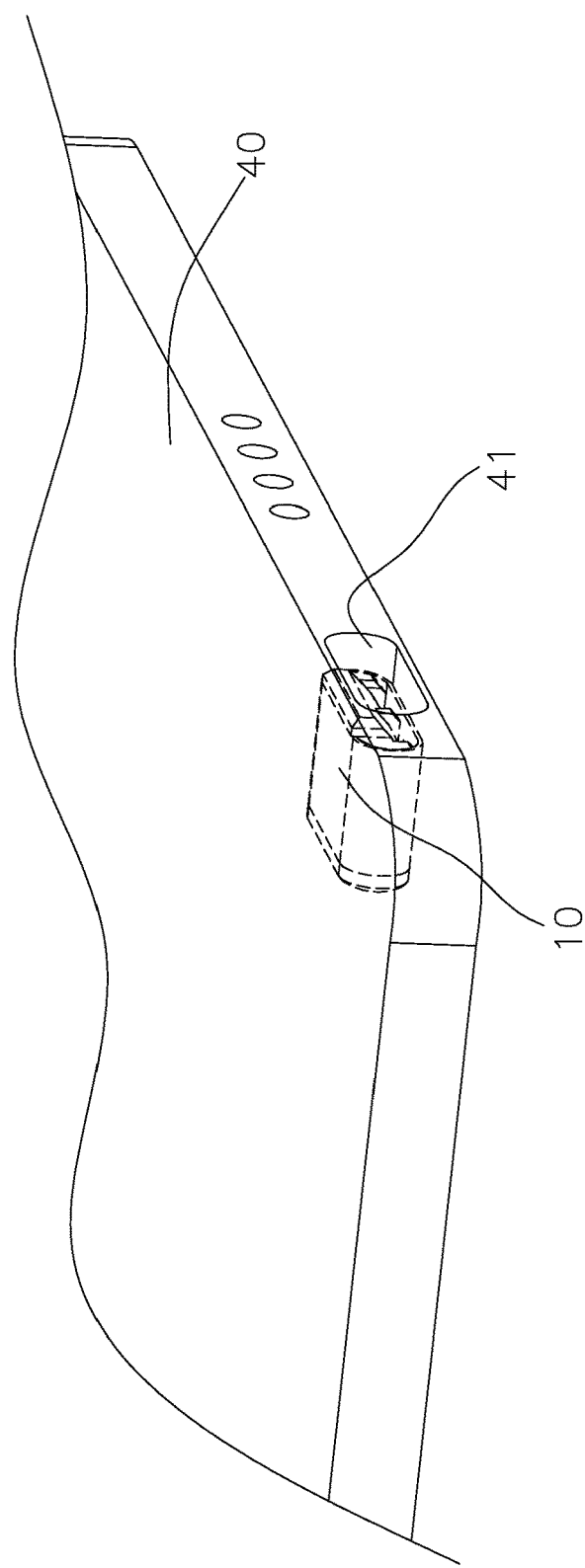
FIG. 10 shows the lock body fully plugged in the port is not exposed therefrom.

Please refer to FIG. 10. It is particularly noted that, when the lock body 10 is plugged in the port 41, the closed rear end 104 (see FIG. 1C) of the lock body 10 is not rearward projected from the port 41 of the electronic apparatus 40. In other words, the lock body 10 has a length the same as a depth of the port 41, so that the lock body 10 is plugged in the port 41 with the closed rear end 104 being flush with an outer end of the port 41; or alternatively, the lock body 10 has a length smaller than a depth of the port 41, so that the lock body 10 is plugged in the port 41 with the closed rear end 104 being located inward the outer end of the port 41. With these arrangements, it is able to prevent the lock body 10 from being arbitrarily pulled out of the port 41.

In summary, the lock body 10 according to the present invention is configured for plugging into the port 41 of the electronic apparatus 40 with the protruded section 1017 tightly abutting on the terminals 42 in the port 41, so that a pressing force is produced between the lock body 10 and the terminals 42 to prevent the lock body 10 from being arbitrarily pulled out of the port 41. With the lock body 10 being plugged in the port 41, any other access means can no longer be plugged into the port 41 to arbitrarily read or write data from or into the electronic apparatus 40 via the port 41. In the case the lock body 10 has the first retaining section 1018 formed thereon, only a lock-operating unit 20 having a corresponding second retaining section 2124 can be used to remove the lock body 10 from the port 41. With this arrangement, it is able to effectively prevent the lock body 10 from being arbitrarily pulled out of the port 41 with other unmatched lock-operating units.

Therefore, compared to the prior art, the lock device for electronic apparatus according to the present invention has the following advantages: (1) it effectively prevents arbitrarily reading or writing of data from or into an electronic apparatus via a port thereof; and (2) it effectively prevents the lock body from being arbitrarily pulled out of the port of the electronic apparatus.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A lock device for electronic apparatus, the electronic apparatus including a port having a plurality of terminals provided therein and a sideward protrusion formed on at least one lateral side of front ends of the terminals, the lock device comprising:
   a lock body being configured for correspondingly plugging into the port of the electronic apparatus, and having at least one protruded section formed therein for tightly abutting on the sideward protrusion located to one side of the terminals to lock the lock body to the port,
   wherein the lock body further includes a lock portion and a cover portion; the lock portion having a top side and a bottom side, which together define a receiving chamber between them, and the protruded section being formed in the receiving chamber; and the cover portion having two open ends and internally defining a receiving space between the two open ends for receiving the lock portion therein.

2. The lock device for electronic apparatus as claimed in claim 1, wherein the lock body has an open front end and a closed rear end, and the open front end being communicable with the receiving chamber.

3. The lock device for electronic apparatus as claimed in claim 1, wherein the lock portion includes a first inner wall surface, a second inner wall surface located adjacent to the first inner wall surface, and a third inner wall surface located opposite to the first inner wall surface; and the protruded section being formed on one of the first and the third inner wall surface.

4. The lock device for electronic apparatus as claimed in claim 3, wherein the protruded section is formed on each of the first and the third inner wall surface.

5. The lock device for electronic apparatus as claimed in claim 1, wherein the protruded section is in a shape selected from the group consisting of a straight post and an upward tapered post.

6. The lock device for electronic apparatus as claimed in claim 2, wherein the lock portion is formed on two lateral sides of the top side with a retaining section each, and the lock portion is formed on the bottom side with a bottom opening, which is communicable with the receiving chamber and the open front end.

7. The lock device for electronic apparatus as claimed in claim 6, wherein the cover portion has a top cover surface and a bottom cover surface; the top cover surface being formed with a plurality of through holes; and the top cover surface of the cover portion and the top side of the lock portion together defining an insertion slot between them.

8. The lock device for electronic apparatus as claimed in claim 7, further comprising a lock-operating unit configured for correspondingly connecting to the insertion slot of the lock body; the lock-operating unit including:
a case portion;
a slide portion being correspondingly fitted in the case portion and including a top plate and a side plate downward extended from each of two opposite lateral edges of the top plate; and the top plate having a push block raised from an upper side thereof and a limiting rib axially formed on a lower side thereof;
a slide-controlled retaining element being disposed in the case portion and assembled to the slide portion; the slide-controlled retaining element including a main body having a hole provided thereon and two laterally spaced extension arms forward extended from the main body; the two extension arms having two facing edges that form two slant sections; a limiting space being defined between the two extension arms and the limiting rib being correspondingly movable in along the limiting space; and two laterally outward extended hooks being formed on front ends of the two extension arms; and
a union element being disposed in the case portion with an extended front end forward projected beyond the case portion; the extended front end of the union element being provided at two lateral sides with a slit each; the two extension arms of the slide-controlled retaining element being fitted in the union element with the two laterally outward extended hooks located corresponding to the two slits; and
wherein the extended front end of the union element is configured for correspondingly plugging into the insertion slot of the lock body, and the two slits are located in and communicable with the insertion slot when the extended front end is fully plugged into the insertion slot; and wherein when the slide portion is pushed toward the lock body, the limiting rib is brought to press against and accordingly laterally separate the two facing slant sections of the extension arms from each other, bringing the two hooks to extend through the two slits into the two retaining sections on the lock body.

9. The lock device for electronic apparatus as claimed in claim 8, wherein the case portion of the lock-operating unit includes an upper case portion and a lower case portion closed to each other; the upper case portion being provided with a top opening, via which the push block of the slide portion is exposed from the upper case portion; the lower case portion internally defining a restricting passage, in along which the limiting rib of the slide portion is slidably fitted; and a boss being formed in the restricting passage near an end thereof for engaging with the hole provided on the main body of the slide-controlled retaining element.

10. The lock device for electronic apparatus as claimed in claim 8, wherein the lock portion includes a lock core formed on the top side at a central area thereof, and the lock-operating unit being provided on the extended front end with a core-matching section adapted to engage with the lock core.

11. The lock device for electronic apparatus as claimed in claim 9, wherein the lock-operating unit further includes a storage case; the storage case internally defining an open storage space with a pivot boss provided therein, and the case portion being provided with a pivot hole corresponding to the pivot boss, so that the pivot boss is pivotally turnably received in the pivot hole, allowing the lock-operating unit not in use to be turned about the pivot boss into the storage space for storage.

12. The lock device for electronic apparatus as claimed in claim 9, wherein the lock portion of the lock body is further provided on an outer wall surface facing away from the second inner wall surface with a first retaining section, and the lock-operating unit being provided on a front end of the lower case portion with a second retaining section complementarily corresponding to the first retaining section.

13. The lock device for electronic apparatus as claimed in claim 12, wherein the first retaining section includes any one of at least one protruded block and at least one recess, and the second retaining section includes the other one of the at least one protruded block and the at least one recess.

14. The lock device for electronic apparatus as claimed in claim 1, wherein the lock body is a lock device structurally configured corresponding to a USB Type-C connector.

* * * * *